US007848859B2

(12) United States Patent
Homeyer et al.

(10) Patent No.: US 7,848,859 B2
(45) Date of Patent: Dec. 7, 2010

(54) DEVICE AND METHOD FOR EVALUATING A SENSOR SIGNAL INDICATING A POSITION OF AN ACCELERATOR PEDAL OF A MOTOR VEHICLE

(75) Inventors: Manfred Homeyer, Markgroeningen (DE); Michael Dornhausen, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1122 days.

(21) Appl. No.: 11/232,799

(22) Filed: Sep. 21, 2005

(65) Prior Publication Data

US 2006/0069476 A1 Mar. 30, 2006

(30) Foreign Application Priority Data

Sep. 22, 2004 (DE) ...................... 10 2004 045 818

(51) Int. Cl.
*G01M 17/00* (2006.01)
*G06F 7/00* (2006.01)
*G06F 19/00* (2006.01)

(52) U.S. Cl. .............................. 701/29; 701/1; 701/70; 123/205; 123/297; 123/319; 123/320; 123/325; 123/399

(58) Field of Classification Search .................. 701/29, 701/1, 70; 123/205, 297, 319, 320, 325, 123/399
See application file for complete search history.

(56) References Cited

U.S. PATENT DOCUMENTS

| | | | | |
|---|---|---|---|---|
| 6,216,061 | B1 * | 4/2001 | Franke et al. | 701/1 |
| 6,328,122 | B1 * | 12/2001 | Yamada et al. | 180/65.23 |
| 2001/0011540 | A1 * | 8/2001 | Mashiki | 123/520 |
| 2002/0073792 | A1 * | 6/2002 | Okada et al. | 74/336 R |
| 2002/0193935 | A1 * | 12/2002 | Hashimoto et al. | 701/110 |
| 2004/0187835 | A1 * | 9/2004 | Hoff et al. | 123/196 R |
| 2005/0016162 | A1 * | 1/2005 | Mehta et al. | 60/285 |
| 2005/0056513 | A1 * | 3/2005 | Reuschel | 192/3.58 |
| 2006/0142918 | A1 * | 6/2006 | Guggolz et al. | 701/51 |

FOREIGN PATENT DOCUMENTS

| | | |
|---|---|---|
| JP | 58135329 | 8/1983 |
| JP | 63272936 | 11/1988 |
| JP | 09202158 | 8/1997 |
| JP | 11236840 | 8/1999 |
| JP | 2000320376 | 11/2000 |
| JP | 2003214197 | 7/2003 |

* cited by examiner

*Primary Examiner*—Khoi Tran
*Assistant Examiner*—Jaime Figueroa
(74) *Attorney, Agent, or Firm*—Kenyon & Kenyon LLP

(57) ABSTRACT

A device and a method for evaluating a sensor signal indicating the position of an accelerator pedal of a motor vehicle. For this purpose, the device compares the sensor signal to a first comparison level, and an idle state is ascertained if the first comparison level is undershot. When a start of the motor vehicle from rest is detected, a departure from the idle state is inferred if a second comparison level, which is lower than the first comparison level, is exceeded.

14 Claims, 2 Drawing Sheets

DEVICE AND METHOD FOR EVALUATING A SENSOR SIGNAL INDICATING A POSITION OF AN ACCELERATOR PEDAL OF A MOTOR VEHICLE

BACKGROUND INFORMATION

In the evaluation of an accelerator pedal of a motor vehicle, the detection of an idle state is particularly important. This state must always be reliably detected so that the engine torque is withdrawn when the driver takes the foot off of the accelerator pedal. So as always to ensure that this idle state is detected, a threshold value is provided for the sensor signal of the accelerator pedal sensor below which the accelerator pedal signal is understood as a request of an idle state. Due to manufacturing tolerances and/or tolerances in the installation of the accelerator pedal into the motor vehicle, this idle threshold has to be chosen in such a way that when all tolerances are taken into account, sufficiently good idle detection is always possible. As a result, however, there is initially a certain free travel when operating the accelerator pedal, in which, in spite of the operation of the accelerator pedal on the part of the driver, no increase of the engine torque is undertaken since in spite of the operation on the part of the driver the sensor signal still lies below the signal threshold provided for idling. In particular when the motor vehicle starts from rest this can cause the engine to stall since the driver has not operated the pedal to a sufficient degree.

SUMMARY OF THE INVENTION

The device according to the present invention and the method according to the present invention have the advantage that for a specific operating state, namely the motor vehicle's starting from rest, a lower response threshold of the accelerator pedal is implemented. As a result, the driver notices almost no free travel of the pedal at least when starting the motor vehicle from rest, which reduces the problems described when starting the motor vehicle from rest. Since this is limited to starting the motor vehicle from rest, this reduction of the free travel does not entail a reduced reliability of the idle detection.

A start from rest is particularly easy to detect if the gradient of the sensor signal is evaluated, particularly in combination with an evaluation of the speed of the motor vehicle. A learning process for the second comparison level is allowed in particular when the sensor signal having a low gradient lies in a region that is lower than the second comparison level. Following a detected start from rest, it is then practical to continue to use the second comparison level for the idle detection for as long as the gradient of the sensor signal is sufficiently high. In this manner, the characteristic curve of the accelerator pedal sensor will continue to be used without a sudden change even after a start from rest for as long as the sensor signal gradient lies above a rest threshold. For safety reasons, the second comparison level should also only be used when no further error messages have been presented, particularly with respect to the accelerator pedal, the storage of the comparison values or the gradient of the accelerator pedal. For safety reasons, at every start of the motor vehicle, the first and second comparison level are first set to the same initial value. Only when a learning process has occurred in a driving cycle will the use of a learned second comparison level be allowed. This measure ensures that no changes have occurred in the accelerator pedal sensor as a result of changes in the motor vehicle during a standstill of the motor vehicle.

DETAILED DESCRIPTION

Figure 1:
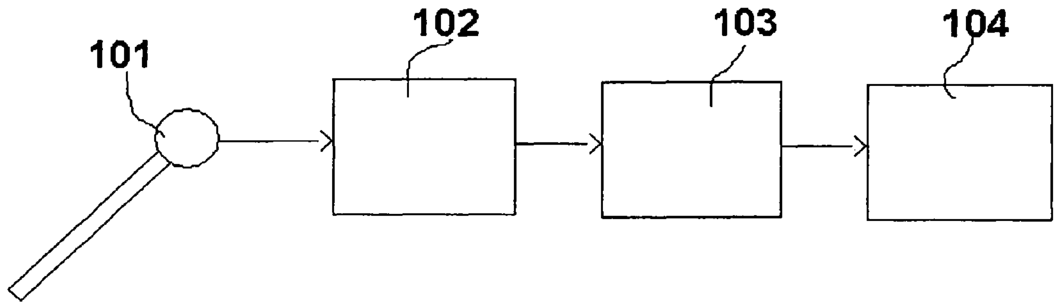
FIG. 1 shows a schematic overall view of the accelerator pedal, the device for evaluating the sensor signal and an engine.

FIG. 1 shows a schematic representation of an accelerator pedal 101, which has a sensor for the position of the accelerator pedal. This sensor, which can take the form of a potentiometer for example, sends a signal, for example a voltage signal, to an evaluation unit 102. Evaluation unit 102 calculates an accelerator pedal position from the sensor signal and passes this on to a control variable calculation device 103, which is usually an engine control unit. Control variable calculation device 103 calculates actuating variables for setting corresponding actuators that are used to control internal combustion engine 104. The corresponding control variables are thus transmitted from control variable calculation device 103 for control purposes to internal combustion engine 104. The entire arrangement is usually used for controlling a motor vehicle, i.e. by operating accelerator pedal 101, the driver of the motor vehicle transmits a torque request to engine 104. Using suitable control signals, internal combustion engine 104 is then triggered in such a way that a corresponding engine torque is generated. The device shown here is referred to as an electronic accelerator pedal.

In the case of such an electronic accelerator pedal care must be taken to ensure that no unauthorized torque requests are issued to control variable calculation unit 103 so that no corresponding torques are generated by internal combustion engine 104. For safety reasons, therefore, special attention must be paid to ensure that an idle state, i.e. the state in which the driver requests no torque from the internal combustion engine, is reliably detected. What is problematic in this regard is the fact that, due to manufacturing tolerances and/or tolerances in the installation of accelerator pedal 101 into the internal combustion engine, it is not always possible to ensure that in every motor vehicle there exists the same correlation between an operation of the accelerator pedal on the part of a driver and a corresponding output signal. This situation is explained further in FIG. 2.

Figure 2:
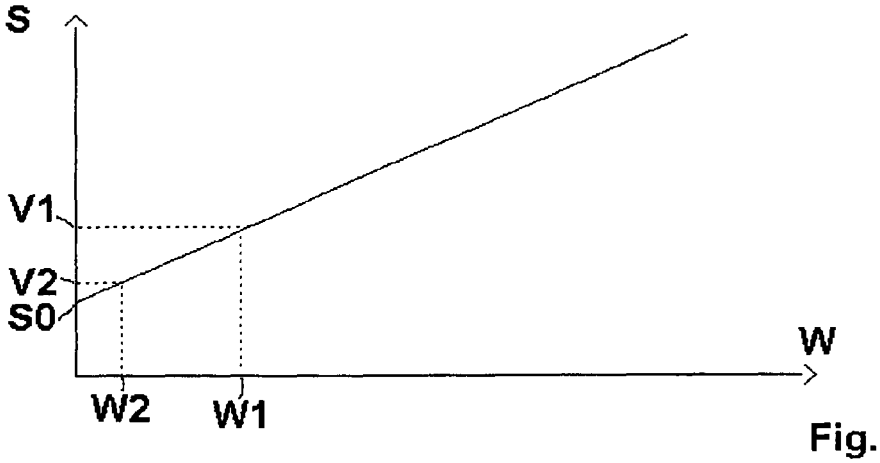
FIG. 2 shows a characteristic curve of an accelerator pedal sensor.

In FIG. 2, the sensor signal S is plotted against the operating path W of accelerator pedal 101 operated by a driver. The characteristic curve S of the signal against the path W corresponds to a straight line, a certain sensor signal S0 already being present at path 0. This value S0 may vary, i.e. depending on manufacturing tolerances or tolerances in the installation of the accelerator pedal in the motor vehicle, the value S0 shifts upward or downward on the S axis. Therefore a comparison value V1 is provided which is chosen in such a way that it is at any rate higher than any value of S0 that is to be expected in the worst case on account of the installation and manufacturing tolerances. Hence, only when sensor signal S exceeds this first comparison value V1, will evaluation unit 102 relay a torque request on the part of the driver to control unit 103. This is to ensure in any event that when the driver does not operate the accelerator pedal, no torque request is emitted to the internal combustion engine. For if value S0, i.e. the intersection of the characteristic curve, would lie above V1, then if the driver releases the accelerator pedal a certain residue torque request would still be made to the internal combustion engine, which is not acceptable for safety reasons.

The difference thus produced between V1 and S0, however, also results in a certain idle travel when a driver operates accelerator pedal 101, i.e. the path W1, which must be traveled until sensor signal S exceeds value V1, is perceived by the driver as a free travel of the pedal. Since this free travel varies from one vehicle to another, this can lead to the driver releasing the clutch with an insufficient torque of the internal combustion engine resulting in a jerky start of the vehicle or a so-called choking of the engine.

To reduce this free travel, a second comparison value V2 is provided according to the present invention, which is significantly lower than comparison value V1. This comparison value V2, however, must be used only if there is no danger that an idle state actually requested by the driver might not be recognized. For this purpose, the gradient, i.e. the change over time of sensor signal S, is used. Whenever the gradient of the sensor signal is negative, i.e. the accelerator pedal is operated in the direction of releasing the accelerator pedal, comparison value V1 is used at any rate. For safety reasons, this also occurs if the gradient of sensor signal S is not greater than a certain rest value, the rest value being at any rate positive. Only if the gradient of sensor signal S is positive to a sufficient degree will comparison value V2 be used to detect an operation of the accelerator pedal. Path W2 associated with second comparison value V2 is significantly lower than free travel W1 of the accelerator pedal. For safety reasons, however, V2 is chosen to be greater than value S0 by a certain offset to ensure that purely statistical fluctuations of sensor signal S are not interpreted as a supposed torque request on the part of the driver.

Figure 3:
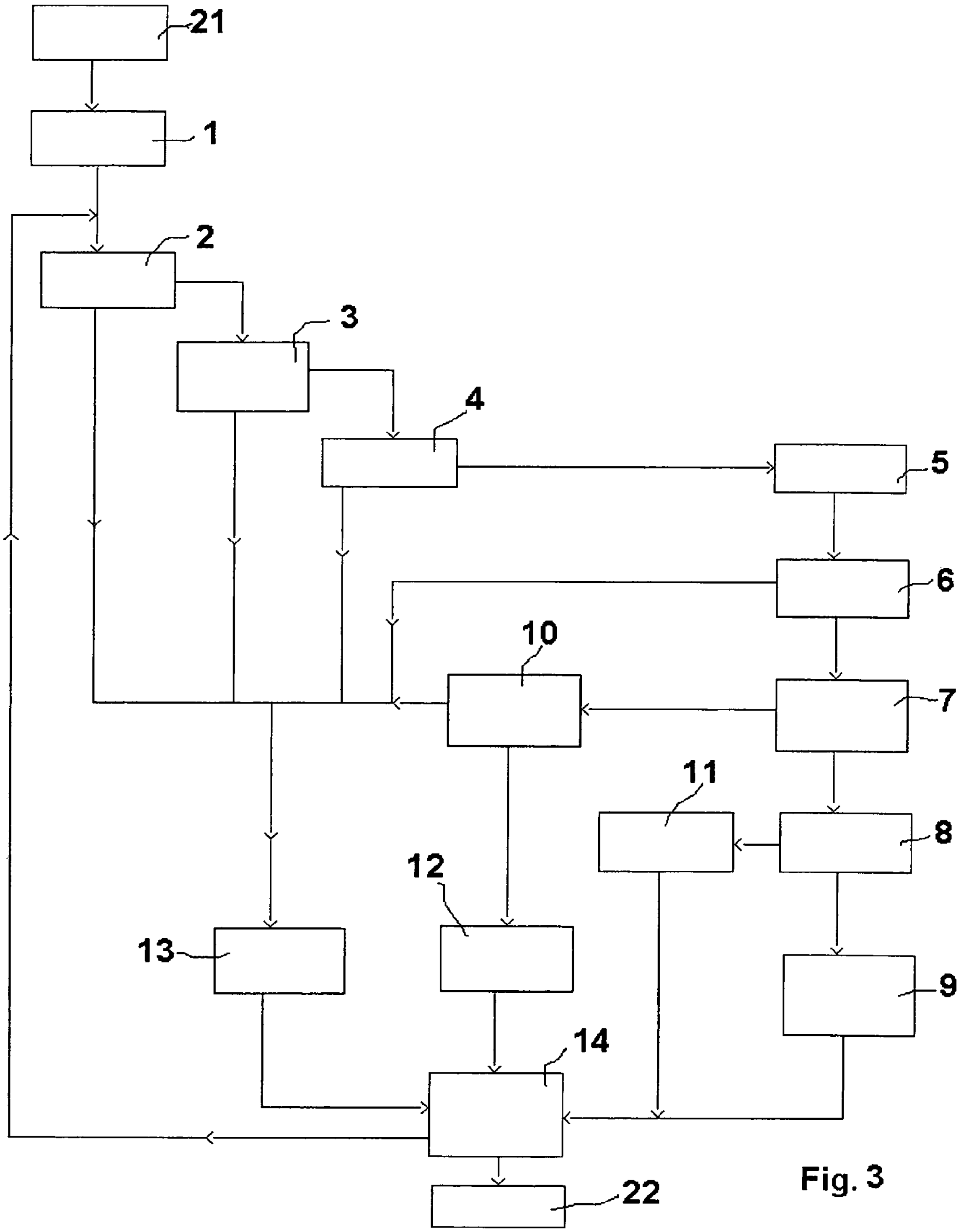
FIG. 3 shows method steps for evaluating a sensor signal indicating the position of an accelerator pedal of a motor vehicle.

FIG. 3 shows a program schema, which is executed by evaluation device 102. When the internal combustion engine is started, first step 21 is invoked, in which the program is started. Step 21 is followed by step 1, in which a first comparison level V1 and a second comparison level V2 are each set to a fixed value. For this purpose, the value for first comparison level V1 is chosen in such a way that with the most unfavorable addition of all manufacturing and installation tolerances of the accelerator pedal sensor, an idle state is at any rate reliably recognized. In this first step 1, second comparison level V2 is also set to a value at which an idle state is reliably recognized. Usually both comparison levels are set to the same value. Step 1 is then followed by step 2 and subsequent steps. Step 1 is executed only once at the start of the internal combustion engine, additional loops of the program without a start of the internal combustion engine starting directly at step 2.

Several confirmation queries are issued in steps 2, 3 and 4 to ensure the proper functioning of the accelerator pedal. In step 2, an initial test determines whether there is an error message with respect to the accelerator pedal. Such error messages may come from other programs that perform a diagnosis of the accelerator pedal. If it is determined in step 2 that there is an error message, then step 2 is followed by step 13. If it is determined in step 2 that there is no error message, then step 2 is followed by step 3. A check is performed in step 3 as to whether second comparison value V2 was read out correctly from the memory. This occurs for example by checking a checksum or the comparison level is stored twice in the memory and a check is performed as to whether both values agree. If it is determined in the process that second comparison value V2 is incorrect, then step 2 is followed by step 13. If it is determined that second comparison value V2 is correct, then step 3 is followed by step 4. A check is performed in step 4 as to whether the accelerator pedal is near full throttle. If this is the case, then step 4 is followed by step 13. If this is not the case, then step 4 is followed by step 5.

In step 13 it is established that first comparison value V1 is used for assessing the question as to whether an idle state exists. Thus step 13 results in the use of the first comparison value, in which at any rate an idle state is reliably recognized even an unfavorable addition of tolerances.

The gradient of the accelerator pedal value is calculated in step 5. The gradient is calculated simply by comparing the input value of the sensor signal to the sensor signal of the previous program run. It is likewise possible to form the gradient by comparing not only the last but several preceding values to each other. The accelerator pedal gradient thus indicates how much the position of the gas pedal changes over time. In an active operation of the accelerator pedal in the full throttle direction, the accelerator pedal gradient is positive. If the driver maintains the accelerator pedal in one position, then the accelerator pedal gradient is 0. If the driver operates the accelerator pedal in the idle direction, i.e. takes the foot from the accelerator pedal, then the accelerator pedal gradient is negative. Step 5 is followed by step 6. A check is performed in step 6 as to whether the accelerator pedal gradient is physically plausible. Since an accelerator pedal can be operated by a human driver only at a finite speed, the accelerator pedal gradient in the positive direction cannot be arbitrarily large. Due to the inertia of the accelerator pedal, the accelerator pedal gradient also cannot be arbitrarily large in the negative direction. Thus, if an implausibly large gradient is established in the positive as well as in the negative direction, then a faulty measurement of the sensor signals is inferred and step 6 is again followed by step 13.

If it was established in step 6 that the accelerator pedal gradient is physically plausible, then step 6 is followed by step 7. A check is performed in step 7 as to whether the value of the sensor signal lies below the second comparison value V2. If this is the case, then step 7 is followed by step 8. A check is performed in step 8 as to whether a start from rest is taking place. For this purpose, first the accelerator pedal gradient is evaluated, a check being performed in particular as to whether the accelerator pedal gradient is above a rest threshold. This rest threshold lies in any case in the range of a positive accelerator pedal gradient, i.e. a check is performed as to whether the driver operates the accelerator pedal in the direction of a load increase. Thus, if the accelerator pedal value lies below second comparison value V2 and has a positive gradient above a rest threshold, then a start of the motor vehicle from rest is inferred. Moreover, a check may also be performed as to whether the speed of the motor vehicle lies below a threshold. This additional query thus ensures that it is a start from rest or from a very slow movement of the vehicle.

Only if a start of the motor vehicle from rest is detected will step 8 be followed by step 9. In this step 9 it is established that second comparison level V2 is drawn upon to establish that the idle state is being left. Thus sensor signals above second comparison level V2 are being understood as torque requests on the part of the driver and the internal combustion engine is accordingly triggered to deliver a load. If it is determined in step 8 that the internal combustion engine is not starting from rest, particularly if there is no positive gradient of the accelerator pedal above the rest threshold, then step 8 is followed by step 11. In this step 11, a learning process is run, in which a value is ascertained for second comparison value V2. The learning process according to step 11 is normally activated following a start of the internal combustion engine if the motor vehicle is operated at idle without the driver operating the accelerator pedal. A particularly simple learning process simply establishes the lowest value for the sensor signal that occurs at least for a certain time. The value thus measured would then correspond to the value S0 in FIG. 2. By adding a certain specified offset, second comparison value V2 is then formed, which is significantly closer to value S0 than first comparison value V1. Due to certain variances of the measuring signal it is not practical to use the value S0, i.e. the lowest possible value, as a second comparison value. For this learning process, additional safety checks may be conducted which ensure that no nonsensical value is ascertained for S0 or the second comparison value V2. Step 9 as well as step 11 are then respectively followed by step 14.

When the internal combustion engine is started, then in step 1 second comparison value V2 is at first set to a safety value. If suitable operating states obtain, then subsequently the learning process of step 11 is implemented, in which a new comparison value V2 is learned. This second comparison value V2 may then be used for reducing the free travel of the accelerator pedal if a start of the motor vehicle from rest is detected.

If it is established in step 7 that the accelerator pedal value lies above second comparison level V2, then step 7 is followed by step 10. In step 10 again a check is performed as to whether the accelerator pedal gradient lies above the rest threshold. If this is the case, then step 10 is followed by step 12. In step 12 it is established that in this case a comparison level used in the last program run will continue to be used for a departure from the idle state. In the case of a start from rest state, second comparison value V2 will continue to be used. If previously comparison value V1 was used, then this value will continue to be used. This has the effect that, when the vehicle starts from rest, second comparison value V2 will continue to be used for as long as the accelerator pedal continues to be operated at a positive gradient. As soon as the accelerator pedal is then no longer operated at a positive gradient above the rest threshold, step 10 is followed by step 13, i.e. first comparison value V1 is then used again to infer a departure from the idle state. Second comparison value V2 is thus used only if the motor vehicle starts from rest, i.e. if, based on a sensor value of the accelerator pedal having a level below V2, the accelerator pedal is operated at a sufficiently strong positive gradient. On the basis of this method it is possible for the powerful safety-related function of the evaluation of accelerator pedal 101 to undertake a reduction of the free travel without the safety of the accelerator pedal evaluation suffering as a result.

What is claimed is:

1. A device for evaluating a sensor signal, which indicates a position of an accelerator pedal of a motor vehicle, comprising:

a comparing arrangement to compare the sensor signal to a first comparison level;

an ascertaining and detecting arrangement to ascertain an idle state if the first comparison level is undershot, detect a start of the motor vehicle from rest, and in the event of a detected start of the motor vehicle from rest, ascertain a departure from the idle state if a second comparison level, which is lower than the first comparison level, is exceeded; and a triggering arrangement to trigger a learning process if the sensor signal is lower than the second comparison level and no start from rest process occurs, a value for the second comparison level being ascertained in the learning process;

wherein a start from rest is detected if a gradient of the sensor signal is above a rest threshold.

2. The device according to claim 1, wherein a start from rest is detected if additionally a speed of the motor vehicle is below a threshold value.

3. The device according to claim 1, wherein in every start process of the motor vehicle, the second comparison level is initially set to a fixed value which is then replaced in the learning process by a learned value.

4. The device according to claim 1, wherein even following a start from rest, the second comparison level continues to be used as long as a gradient of the sensor signal is above a rest threshold.

5. A device for evaluating a sensor signal, which indicates a position of an accelerator pedal of a motor vehicle, comprising:

a comparing arrangement to compare the sensor signal to a first comparison level; an ascertaining and detecting arrangement to ascertain an idle state if the first comparison level is undershot, detect a start of the motor vehicle from rest, and in the event of a detected start of the motor vehicle from rest, ascertain a departure from the idle state if a second comparison level, which is lower than the first comparison level, is exceeded;

wherein a start from rest is detected if a gradient of the sensor signal is above a rest threshold, and wherein the second comparison level is used only if it is ascertained that there exists no fault in the accelerator pedal, that the second comparison level has no fault and that a gradient of the accelerator pedal is plausible.

6. A method for evaluating a sensor signal, which indicates a position of an accelerator pedal of a motor vehicle, the method comprising:

comparing the sensor signal to a first comparison level;

ascertaining an idle state if the first comparison level is undershot; and inferring, when a start of the motor vehicle from rest is detected, a departure from the idle state if a second comparison level, which is lower than the first comparison level, is exceeded; and triggering a learning process if the sensor signal is lower than the second comparison level and no start from rest process occurs, a value for the second comparison level being ascertained in the learning process;

wherein a start from rest is detected if a gradient of the sensor signal is above a rest threshold.

7. The method according to claim 6, wherein a start from rest is detected if additionally a speed of the motor vehicle is below a threshold value.

8. The method according to claim 6, wherein in every start process of the motor vehicle, the second comparison level is initially set to a fixed value which is then replaced in the learning process by a learned value.

9. The method according to claim 6, wherein even following a start from rest, the second comparison level continues to be used as long as a gradient of the sensor signal is above a rest threshold.

10. A method for evaluating a sensor signal, which indicates a position of an accelerator pedal of a motor vehicle, the method comprising:

comparing the sensor signal to a first comparison level;

ascertaining an idle state if the first comparison level is undershot; and inferring, when a start of the motor vehicle from rest is detected, a departure from the idle state if a second comparison level, which is lower than the first comparison level, is exceeded;

wherein a start from rest is detected if a gradient of the sensor signal is above a rest threshold, and wherein the second comparison level is used only if it is ascertained that there exists no fault in the accelerator pedal, that the second comparison level has no fault and that a gradient of the accelerator pedal is plausible.

11. The method according to claim 6, wherein a start from rest is detected if additionally a speed of the motor vehicle is below a threshold value, and wherein in every start process of the motor vehicle the second comparison level is initially set to a fixed value which is then replaced in the learning process by a learned value.

12. The method according to claim 11, wherein even following a start from rest the second comparison level continues to be used as long as a gradient of the sensor signal is above a rest threshold, and wherein the second comparison level is used only if it is ascertained that there exists no fault in the accelerator pedal, that the second comparison level has no fault and that a gradient of the accelerator pedal is plausible.

13. The device according to claim 1, wherein a start from rest is detected if additionally a speed of the motor vehicle is below a threshold value, and wherein in every start process of the motor vehicle the second comparison level is initially set to a fixed value which is then replaced in the learning process by a learned value.

14. The device according to claim 13, wherein even following a start from rest the second comparison level continues to be used as long as a gradient of the sensor signal is above a rest threshold, and wherein the second comparison level is used only if it is ascertained that there exists no fault in the accelerator pedal, that the second comparison level has no fault and that a gradient of the accelerator pedal is plausible.

* * * * *